United States Patent [19]

Deardorff et al.

[11] 4,216,041
[45] Aug. 5, 1980

[54] ENERGY PRODUCING WASTE MATERIAL COMPOSITION AND METHOD OF PREPARATION

[76] Inventors: Paul A. Deardorff, 1128 Dix, Lincoln Park, Mich. 48146; Robert C. Wood, 36002 Huron River Dr., New Boston, Mich. 48164; Sante M. Cundari, 530 Woodcrest, Dearborn, Mich. 48124

[21] Appl. No.: 923,054

[22] Filed: Jul. 10, 1978

Related U.S. Application Data

[63] Continuation-in-part of Ser. No. 901,492, May 1, 1978.

[51] Int. Cl.² ................ C06B 33/00; C06B 21/00
[52] U.S. Cl. .................... 149/44; 149/109.6; 149/37; 264/3 R
[58] Field of Search .............. 149/37, 44, 109.6; 264/3 R

[56] References Cited

U.S. PATENT DOCUMENTS

| | | | |
|---|---|---|---|
| 1,430,667 | 10/1922 | Merrefield | 149/37 |
| 1,751,550 | 3/1930 | Hyde | 149/37 |
| 2,276,671 | 3/1942 | Renstschler et al. | 149/37 |
| 3,160,537 | 12/1964 | Trafton, Jr. | 149/37 |
| 3,347,721 | 10/1967 | Jago | 149/37 |
| 3,745,077 | 7/1973 | Jones et al. | 149/40 |
| 4,055,881 | 11/1977 | LaBate | 149/37 |
| 4,114,591 | 9/1978 | Nakagawa | 149/37 |

FOREIGN PATENT DOCUMENTS

| | | | |
|---|---|---|---|
| 1467737 | 10/1969 | Fed. Rep. of Germany | 149/37 |
| 579741 | 8/1946 | United Kingdom | 149/37 |

*Primary Examiner*—Edward A. Miller
*Attorney, Agent, or Firm*—Gifford, VanOphem, Sheridan & Sprinkle

[57] ABSTRACT

The present invention combines sewage by-products such as sludge cake, with a composition which includes iron-containing waste materials to form a heat-producing composition. First, waste materials from the conversion of iron ore to pig iron or steel combine with a reducing metal, such as aluminum or magnesium, and a small portion of a mineral acid to form a reaction mixture which gives a heat output superior to many conventional fuels. Then, this composition is admixed with sludge cake from a city sewage plant to produce a fuel which not only utilizes city sewage to some advantage but also gives a good heat output. The materials are processed in several steps to produce either a shaped or loose composition, a portion of which is then heated to a reaction temperature.

27 Claims, No Drawings

ENERGY PRODUCING WASTE MATERIAL COMPOSITION AND METHOD OF PREPARATION

CROSS-REFERENCE

The present invention is a continuation-in-part of our copending U.S. Patent Application Ser. No. 901,492 filed May 1, 1978.

BACKGROUND OF THE INVENTION

I. Field of the Invention

The present invention relates generally to fuels for heat production, such fuels being comprised primarily of the waste materials remaining after steel or pig iron production from iron ore and sludge cake from sewage treatment plants.

II. Description of the Prior Art

The iron-containing waste materials are of a class known as thermit materials. Many thermit materials are well known for use as external heat producers for welding, for incendiary compositions, and for other uses. Burch, in U.S. Pat. No. 2,402,947 describes a Flux Forming Fuel and Process. Jones, in U.S. Pat. No. 3,745,077 describes a Thermit Composition for use as an incendiary. Thermit materials have also been used as a retardant in conjunction with higher temperature reactants. Cox, in U.S. Pat. No. 3,181,937 teaches a device which employs this technique.

The term "thermit" generally refers to a mixture of iron oxides and aluminum which, when heated, reacts at temperatures of about 5000° F. The term "thermit" is also used to refer to a combination of any of several reducing metals with iron oxides. The reducing metal may be aluminum, magnesium, and the like. The following reactions are typical:

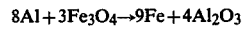

$8Al + 3Fe_3O_4 \rightarrow 9Fe + 4Al_2O_3$

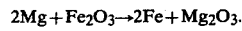

$2Mg + Fe_2O_3 \rightarrow 2Fe + Mg_2O_3$.

Many variations of this type reaction are known in the art. For example, Rejdak, in U.S. Pat. No. 3,020,610 teaches a variation of the method which is particularly useful for welding aluminum to aluminum. Also, see Rejdak's U.S. Pat. No. 3,033,672 which describes a method for welding copper to steel.

The reactions are exothermic and can react at temperatures in excess of about 6000° F. Interestingly, none of the methods to date have used either the method or the easily obtained materials of Applicant's invention. Heretofore, these reactions have typically employed chemically pure materials. Most applications direct the reaction heat to a localized area or specified material as in the case of welding or incendiary applications. Cost and availability of these relatively expensive materials have to date precluded use of such materials for commercial fuel requirements.

The sewage by-products referred to herein are of a type known as sludge cake, or the like. They are high moisture content solids resulting from sewage treatment. Raw sewage undergoes a series of processes to kill harmful bacteria and place the sewage in a safe, easily disposable form. These processes include skimming, settling, conveying, and others. Heretofore, the sludge cake has been simply disposed of without any benefit thereafter.

It is therefore an object of the present invention to beneficially utilize sludge cake from sewage treatment plants.

It is also an object of the present invention to overcome the cost and availability restrictions of conventional fuels and previously known thermit materials.

These and other objects of the present invention will become apparent to one skilled in the art by an analysis of the following description of the preferred embodiment.

SUMMARY OF THE INVENTION

We have found that the foregoing and related objects can be attained by forming a composition wherein the primary ingredients are iron-containing waste by-products from steel production or similar processes and sewage sludge cake. These by-products had heretofore been merely disposed of.

The waste materials are combined with a concentrated mineral acid and retardants. Alternately, diluted acid may be used thus requiring less water to make the mixture moldable in a later step. Aluminum, magnesium, or another reducing metal is added to enough water to make the mixture pliable. The mixture is then molded and is cured for a short period. Sufficient heating of a small portion induces reaction of the entire sample.

Applicants have devised a method of combining any of several iron-containing by-products with sewage sludge cake and other materials to form a composition in either shaped or loose form to be used for heat production. Tests have shown that the exothermic heat produced by such compositions is enough to warrant its use as a fuel.

Any of several iron-containing by-products may be combined with sludge cake. These include flue dust, mill scale, B.O.P. dust, filter cake, and sinter blends. In addition to the above list of by-products, any dust-like or powdery iron-containing waste product is suitable for the invention. Analysis of the materials was performed and all contain iron oxides. By way of example, the following result was obtained for B.O.P. dust.

| Substances | Approximate % by weight |
|---|---|
| Free metallic iron | 0.4 |
| $Fe_2O_3$ | 49.0 |
| FeO | 20.4 |
| Carbon | 0.7 |
| $H_2O$ (liquid) | 1.0 |
| PbO | 0.7 |
| ZnO | 5.1 |
| CaO | 11.3 |
| MnO | 0.9 |
| $P_2O_5$ | 0.1 |
| $SiO_2$ | 1.7 |
| $Al_2O_3$ | 0.5 |
| MgO | 2.8 |
| Moisture | 1.9 |

B.O.P. dust is a by-product from steel production. Most steel production from iron ore involves two basic phases. The first phase melts iron ore in a blast furnace producing iron, clinkers, and in relatively small amounts several dust-like iron containing waste by-products. These dust-like by-products collect on the iron, in flues, and on other areas. The second phase of the steel production converts the aforementioned iron to steel in an electric furnace. This electric furnace process also produces relatively small amounts of iron-containing waste by-products. The by-products from both phases normally vary from about 30% to about 70% by weight iron.

It is the scheme of the present invention to combine the aforementioned iron-containing waste by-products with sewage by-products such as sludge cake or the like, for heat production in various industrial, commercial, or consumer applications such as, for example, production of steam.

Samples of sludge cake from two different city sewage treatment plants were analyzed with the following result obtained

| Sludge Cake | Approximate % by weight | |
| --- | --- | --- |
| Ingredient | Sample A | Sample B |
| Sulfur | 1.0 | 1.1 |
| Carbon | 49.0 | 47.1 |
| Hydrogen | 5.2 | 5.0 |
| Oxygen | 8.8 | 9.4 |
| Nitrogen | 4.7 | 5.1 |
| Chlorine | 1.0 | 1.2 |
| Calcium Oxide | 14.8 | 15.1 |
| Magnesium Oxide | 2.6 | 3.0 |
| Iron Oxide | 8.8 | 7.9 |
| Sodium and Potassium Oxide | 2.3 | 1.8 |
| Titanium Dioxide | Trace | Trace |
| Mercury | Trace | Trace |
| Pbb | Trace | Trace |
| Zinc Oxide | 0.9 | 1.2 |
| Silicone Dioxide | Balance | Balance |

DESCRIPTION OF THE PREFERRED EMBODIMENT

The following are particularly preferred examples.

EXAMPLE 1

Materials 40 ounces of filter cake
20 ounces of dry B.O.P. dust
40 ounces of sludge cake (sample A)
20 ounces of aluminum powder with the largest dimension of any aluminum particle no larger than about ⅛ inch
7.5 ounces of a solution of 20% by weight hydrochloric acid Method The three waste by-products are mixed. The acid is added and the composition is mixed well and then allowed to stand for about an hour. Enough water is added to make the composition moldable. The aluminum is added. The composition is again mixed well, poured into a brick-shaped mold, and pressed at a pressure of about ten pounds per square inch or more. This mold is then allowed to cure by standing for about three hours. While the mixture stands, it is observed that a reaction heating occurs to such a temperature that steam is given off and the composition then usually hardens to a dimensionally stable form or brick of about 28 cubic inches in volume. At this point the product may be stored for extended periods of time without any detrimental effects. The storage is quite safe since only a very high temperature can initiate the reaction. A portion of the resulting brick is then heated by an electric arc. An initial reaction temperature of greater than 3000° F. is required. The composition burns at a rate of about 0.20 cubic inches per minute, reaches a maximum temperature of about 6000° F., and produces heat measured to be about 75,000 BTU per pound of composite. This can be compared with bituminous coal which yields about 12,000 BTU per pound.

The reaction gives off a moderate white smoke of steam containing very small amounts of the oxides of carbon, nitrogen, and sulfur as well as a trace of finely suspended particulate matter. A residue brick remains which is about 90% by weight of the unreacted composition. This brick, upon cooling, can be easily crumbled for use as a filler or the like.

Interestingly, additional bricks can be placed next to a reacting brick to initiate reaction for such bricks. Additionally, long shapes can be produced to prolong and control the reactions. In the examples listed herein the reaction is steady and reasonably uniform.

EXAMPLE 2

Materials 10 ounces of black filter cake from 1975 pig iron production
10 ounces of black filter cake from 1978 pig iron production
10 ounces of B.O.P. dust
30 ounces of sludge cake (sample A)
12 ounces of aluminum powder with the largest dimension of any aluminum particle no larger than about ⅛ inch
3 ounces of water
4 ounces of hydrochloric acid solution, 20% by weight Method The procedure used was the same as in Example 1. Upon initiation heating, the reaction continues with a volume burn rate of about 0.22 cubic inches per minute, a maximum temperature of about 6000° F., and heat production measured to be about 82,000 BTU per pound of composite. A moderate white smoke of substantially the same composition as in Example 1 was envolved. Again, a readily crumbled brick of about 90% by weight remained.

EXAMPLE 3

Materials 20 ounces of dry B.O.P. dust
20 ounces of filter cake from 1975 pig iron production
40 ounces of sludge cake (sample B)
16 ounces of aluminum with the largest dimension of any particle no larger than about ⅛ inch
5 ounces of hydrochloric acid solution, 20% by weight Method Again, the procedure used was the same as that in Example 1. Ignition of a portion of the sample by electric arc in excess of 4000° F. produced a volume reaction burn rate of 0.18 cubic inches per minute, a maximum temperature of about 6000° F., and resulting heat calculated to be about 76,000 BTU per pound. A moderate white smoke evolved and a readily crumbled brick, 90% of the original weight remained.

The aluminum or other reducing metal is preferably smaller than about 1/10 inch in its largest dimension. Any mineral acid is effective in the process either alone or in combination, but hydrochloric acid is preferred.

The reaction rate can be controlled by variation of the portions of sewage by-product, iron-containing waste material, or reducing metal. The materials should fit within the parameters listed below:

| Material | Parameter |
|---|---|
| Iron-containing by-products: | at least about 40% of the composite mixture |
| Reducing metal: | about 18 to about 50% by weight of the iron-containing by-product |
| Sludge cake: | less than about 40% by weight of the composite mixture |
| Acid: | about 4% to about 15% by weight of the iron-containing by-product |

To the above mixture, sufficient water, if necessary may be added to make the mixture moldable. Tests have indicated that these compositions burn well with coal. Aluminum "dross", an impure aluminum waste, has been used in pulverulent form in lieu of commercially purchased metal. This has proven effective for the reaction when used in sufficient quantity. Use of aluminum dross also lowers the cost of the composition.

The composition can be used in a system at or near a sewage treatment plant site by adaptation of equipment to mix the materials, compress the mixture, and carry out the reaction. Of course, completely dry sewage by-product solids can be used in lieu of sludge cake.

The crumbly, ash-like material of the bricks remaining after the reaction and cooling is potentially available for a great number of uses including sanitary fill, which uses will be readily apparent to one skilled in the art.

Having described our invention, it is not intended that the examples in any way limit the scope of the invention as other variations of the composition and method will become apparent to one skilled in the art. Therefore, we claim:

1. A composition for the production of heat and for the combustion and reaction of processed sewage sludge cake, said composition comprising, the reaction product of mixing:
   less than about 40% by weight sewage sludge cake;
   at least about 40% by weight of an iron-containing by-product from the production of steel said iron-containing by-product including iron oxide;
   a mineral acid;
   about 4% to 20% by weight of a pulverulent metal selected from the group consisting of aluminum, magnesium, and manganese;
   and sufficient water to make the mixture moldable.

2. A composition as defined in claim 1 and additionally comprising a plurality of iron-containing by-product from the production of steel.

3. A composition as defined in claim 1 wherein the iron-containing by-product is flue dust.

4. A composition as defined in claim 1 wherein the iron-containing by-product is mill scale.

5. A composition as defined in claim 1 wherein the iron-containing by-product is B.O.P. dust.

6. A composition as defined in claim 1 wherein the iron-containing by-product is filter cake.

7. A composition as defined in claim 1 wherein the iron-containing by-product is a sinter blend.

8. A composition as defined in claim 1 wherein the mineral acid is hydrochloric.

9. A composition as defined in claim 1 wherein the reducing metal is aluminum in the amount of about 10% to about 20% by weight and wherein the aluminum is in powdered form such that the largest dimension of any aluminum particle does not exceed about ⅛ inch 10. A composition as defined in claim 1 wherein the pulverulent reducing metal is in the form of an impure waste.

11. A composition according to claim 1 wherein the pulverulent reducing metal is aluminum dross waste.

12. A composition according to claim 1 wherein said sludge cake is a semisolid of high moisture content.

13. A composition according to claim 1 wherein said sludge cake is a dry solid.

14. A method for preparing a composition for the production of heat comprising the steps of:
   (a) mixing an iron-containing waste by-product, said iron-containing waste by-product including iron oxide, with sewage sludge cake;
   (b) mixing well with acid;
   (c) adding any water required to make the substance pliable;
   (d) adding a reducing metal.

15. A method as defined in claim 14 further comprising the subsequent step of molding the composition.

16. A method as defined in claim 14 wherein the acid is hydrochloric acid.

17. A method as defined in claim 14 wherein the reducing metal is aluminum in the amount of about 10% to about 20% by weight and wherein the aluminum is in powdered form such that the largest dimension of any aluminum particle does not exceed about ⅛ inch.

18. A method as defined in claim 14 wherein the iron-containing waste is flue dust.

19. A method as defined in claim 14 wherein the iron-containing waste is mill scale.

20. A method as defined in claim 14 wherein the iron-containing waste is B.O.P. dust.

21. A method as defined in claim 14 wherein the iron-containing waste is filter cake.

22. A method as defined in claim 14 wherein the iron-containing waste is a sinter blend.

23. A method as defined in claim 14 wherein a plurality of iron-containing wastes by-products are used.

24. A method as defined in claim 14 wherein the said reducing metal is added in the form of an impure waste.

25. A method as defined in claim 14 wherein the reducing metal is impure aluminum dross waste.

26. A method as defined in claim 14 wherein said sludge cake is a dry solid.

27. A method as defined in claim 14 wherein said sludge cake is a semisolid of high moisture content.

* * * * *

UNITED STATES PATENT AND TRADEMARK OFFICE
CERTIFICATE OF CORRECTION

PATENT NO. : 4,216,041
DATED : August 5, 1980
INVENTOR(S) : Deardorff et al.

It is certified that error appears in the above-identified patent and that said Letters Patent are hereby corrected as shown below:

Column 4, line 40, delete "envolved" and insert --evolved-- therefor;

Column 6, line 13, after "inch" insert --.--.

Signed and Sealed this

Twenty-eighth Day of October 1980

[SEAL]

Attest:

SIDNEY A. DIAMOND

Attesting Officer

Commissioner of Patents and Trademarks